(12) United States Patent  (10) Patent No.: US 7,865,015 B2
Chen et al.  (45) Date of Patent: Jan. 4, 2011

(54) METHOD FOR VIDEO OBJECT SEGMENTATION

(75) Inventors: Chao-Ho Chen, Tai-Nan (TW); Yung-Chuen Chiou, Yilan County (TW)

(73) Assignee: Huper Laboratories Co. Ltd., Jong-Shan District, Taipei (TW)

( * ) Notice: Subject to any disclaimer, the term of this patent is extended or adjusted under 35 U.S.C. 154(b) by 943 days.

(21) Appl. No.: 11/620,708

(22) Filed: Jan. 7, 2007

(65) Prior Publication Data

US 2007/0195993 A1   Aug. 23, 2007

Related U.S. Application Data

(60) Provisional application No. 60/766,973, filed on Feb. 22, 2006.

(51) Int. Cl.
*G06K 9/34* (2006.01)
(52) U.S. Cl. .................................... 382/173
(58) Field of Classification Search ................ 382/103, 382/173
See application file for complete search history.

(56) References Cited

U.S. PATENT DOCUMENTS 5,686,956 A * 11/1997 Oh et al. ................ 348/14.15
6,137,913 A * 10/2000 Kwak et al. ............... 382/236
6,192,079 B1 * 2/2001 Sharma et al. ......... 375/240.16
6,526,096 B2 * 2/2003 Lainema et al. ....... 375/240.16
7,317,830 B1 * 1/2008 Gordon et al. ............. 382/173

OTHER PUBLICATIONS

Matthews et al. "A Bayesian Approach to Uncovered Background and Moving Pixel Detection." 1995 International Conference on Acoustics, Speech and Signal Processing, May 9, 1995, vol. 4, pp. 2245-2248.*
Song et al. "A Real-Time Algorithm for Moving Objects Detection in Video Images." Proceedings of the5th World Congress o Intelligent Control and Automation, Jun. 15, 2004, pp. 4108-4111.*
The Study on Real-Time Video Object Segmentation Algorithm Based on Change Detection and Background Updating,p. 25-40,43-56, Jun. 2005.

* cited by examiner

*Primary Examiner*—Jon Chang
(74) *Attorney, Agent, or Firm*—Winston Hsu; Scott Margo

(57) ABSTRACT

Disclosed is a method for video object segmentation, which includes the following steps:(a) detecting a changing state between a current frame and a previous frame; (b) categorizing the current frame as a moving region, a still region, a background region and an uncovered background region according to the detecting result from the step (a); (c) determining a moving object in the current frame according to the sorting result from the step (b); and (d) updating a background component.

15 Claims, 10 Drawing Sheets

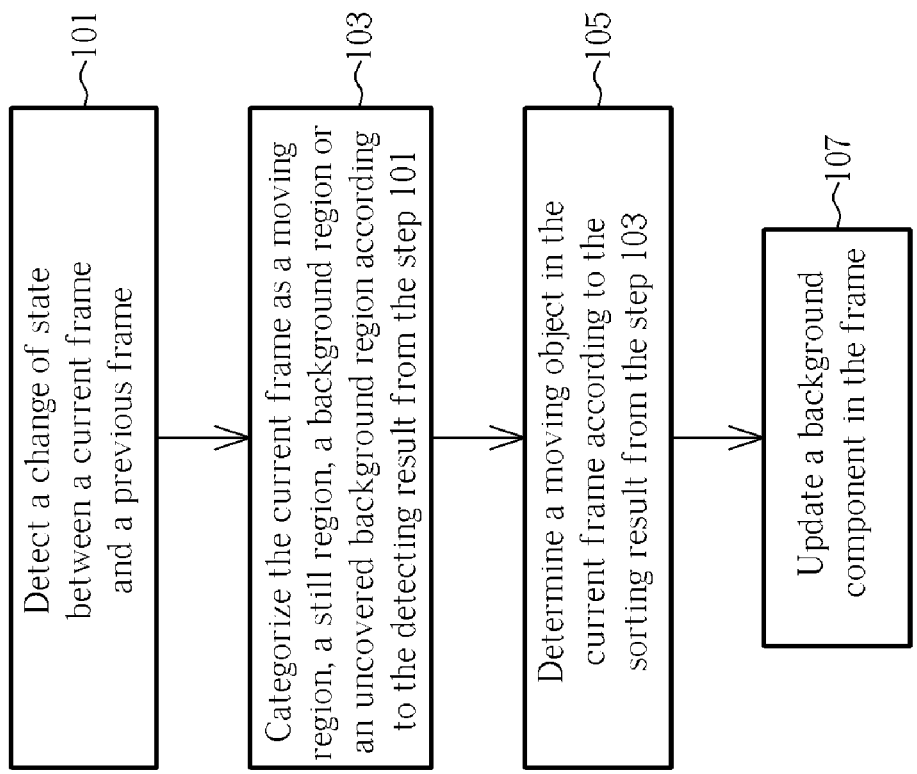

| Region classification | Background subtracting mask | Frame difference value mask |
|---|---|---|
| Backgroung region | OFF | OFF |
| Uncovered background region | OFF | ON |
| Still region | ON | OFF |
| Moving region | ON | ON |

Fig. 3b

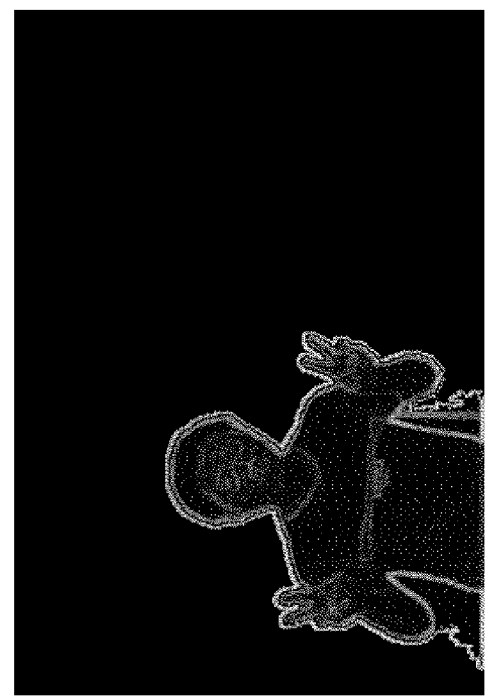
Fig. 7

METHOD FOR VIDEO OBJECT SEGMENTATION

CROSS REFERENCE TO RELATED APPLICATIONS

This application claims the provisional application, which is U.S. Provisional Application No. 60/766,973, filed Feb. 22, 2006 and is included herein by reference.

BACKGROUND OF THE INVENTION

1. Field of the Invention

The present invention relates to a method for video object segmentation, and more particularly relates to a method for video object segmentation that updates a static object to the background by updating background.

2. Description of the Prior Art

In recent years, computer and communication techniques have improved gratefully, as well as digital media techniques. Since digital media techniques can directly transmit to users by utilizing reduced data amounts, these improvements deeply affect users of such technology. The concept of media comprises not only normally used music and images, but also other media such as spoken words, images and diagrams. 3C (computer, communication, and consuming) integrated electronic products such as MP3 video, mobile phones with cameras, and electronic clothes also popularize media techniques. In this broad field, video technique is a popular research object. Different from single static image, video also considers time, thus video can be regarded as a single image continuously varying in a specific period of time. Therefore, the data amount increases rapidly as time increases, and it becomes a serious problem of media signal processing.

Prior art video object segmentation methods can be classified into two kinds, one kind of which is automatic video object segmentation, and the other kind is semi-automatic video object segmentation. Automatic video object segmentation is also called unsupervised video object segmentation method, which automatically segments the video object through a computer. Semi-automatic video object segmentation method is also called supervised video object segmentation method, which defines the object regions to be segmented prior to segmentation, and frames are segmented according to defined object regions. The two kinds of segmentation methods are described below. Normally, automatic video object segmentation method comprises the video object segmentation method based on object edge information, the video object segmentation method based on time and spatial domain, and the semi-automatic video object segmentation method comprising video object segmentation methods which interacts with the user.

The video object segmentation method based on object edge information always utilizes Canny edge detecting operators to get object outline information. In the first step, the method computes the difference between two nearby frames, and performs Canny edge detection to generate a double object edge map. After that, object edge of the current frame is subtracted. Next, the edge of static and dynamic edge can be merged to obtain the object outline. Finally, a more complete outline can be obtained by jointly detecting horizontal and vertical regions and type operating. Such a method utilizes a Canny operator, which determines reliability of the edges according to the gradient, to obtain a static object. The difference gradient is near to zero when the grains of object region and background region are similar, thus the object edge may miss. Also, noises may be causes of error in determining dynamic and static edges. The segmented object outlines therefore, may be different from the original object edge. Additionally, another disadvantage of this method is that an absolute background is obtained from video, that is, no moving objects, but such situation rarely happens in the real world.

The video object segmentation method based on time domain and spatial domain is the most popular segmentation algorithm, and utilizes segmentation region in spatial domain to assist segmentation defect to provide an accurate outline location. The most popular video object segmentation method based on time domain and spatial domain always comprises watershed techniques and K-Mean grouping techniques. Such algorithms always comprise: time domain, spatial domain, and the combination of time domain and spatial domain. The time domain further comprises three steps: all field motion estimation and compensation, environment change detection and core segmentation. The all field motion estimation and compensation is used for compensate the movement of camera, and the environment change detection is used for detecting if there is environment change in inputted video frames. These two methods are preprocessing steps for obtaining time domain. After that, the core segmentation of time domain is performed, and a change detecting method is used to determine if there is any pixel changing in the obtained motion information by utilizing probability estimation method. After that, spatial domain segmentation is performed, which utilizes image content to define the images as meaningful or non-meaningful. However, the regions defined by a computer are different from which defined by human observation. That is, some regions are defined as different through human eyes but are defined as similar with a computer.

The watershed technique classifies the pixels with similar gray levels as the same region. Of all methods of watershed technique, an immersion-based method is the most popular, which starts operation from the minimum value of the region, that is, the location with a minimum value of image gradient. It is imagined that a hole is formed, and the water rises from this hole, and pixels with similar gradient values are classified as the same region, and the region is enlarged until it reaches the maximum value of the image gradient value that is the highest point of the plane. Then, a dam is build to prevent the water of different regions. Finally, the information in time domain and spatial domain is merged to obtain final object region outline.

The watershed technique is sensitive to noise however, and the problem of over-segmentation may occur. Though most effects can be omitted via image processing, apparent grains may happen on face region, that is, the face regions should be determined as the region but still be divided). Thus, a region merging method is needed to solve the problem of over-segmenting. Such methods increase the loading of the system. However, the complexity of merging it to a real time system is also increased.

Additionally, K-Mean grouping technique is used to divide the region into k similar regions. After that, an AND operation is performed to the divided region and the corresponding change detection result region, and if the result of AND operation divided by the pixel numbers of the region is larger than predetermined threshold value, then the region is determined as a moving region. Afterwards, a region description operator is used to obtain a moving object. However, such methods do not utilize a threshold value adaptive to video, and thus the obtained moving region is not perfect. Since the detection result of most of the foreground object with static parts are ignored, the foreground object is barely obtained after the region dividing operation. In this case, though the complete object outline can be obtained from the region description operator, more computing time for comparing front and current frames is needed, which is hard for a real time system. Furthermore, it is also an important issue that the K-Mean grouping technique determines the number of classified groups.

The method based on change detection is used for detecting the variance between two nearby frames. The most popular detection method is to subtract nearby frames, to thereby obtain the difference indicating the variance level of the object in nearby frames to be a reference for changing of nearby frames.

After change detecting, the result of object masking is utilized next to obtain a complete object outline. Since the difference of frames is directly utilized to determine moving information, this method has low resistance to outside interference such as light change shadow or noise, but has a low computing amount. Additionally, such methods may lose useable motion information if the moving object suddenly stops or moves slowly after moving for a period of time. Some inventions disclose how to solve this problem, but still cannot solve the problems of changing brightness and shadow effect, and the uncovered background of which may incorrectly determine the background region as a foreground region. One of the prior art methods utilizes the motion estimation method to determine if the displacement vector in the change region at time k corresponds to the change region at time k+1. If it does, the region is determined as a foreground object; otherwise it is a background region. Such a method cannot have a high accuracy of edges due to the use of motion estimation. Otherwise, the method can only process translation type objects, and may wrongly determine the movement of other types, thus the computing complexity of the system may increase.

Finally, the video object segmentation method, which interacts with the user, allows a user to circle the object outline of the object to be segmented first. Then, it tracks the circled region in following frames and updates the relative information, and combines the image content to obtain object region. Such method may have finer objects outlined, but may incorrectly update outlines if the obtained characteristics do not have high relative characteristics. Thus efficiency is decreased, and the application of such methods is limited.

As described-above, each method presents different disadvantages. A new invention is therefore needed to solve above mentioned problems.

SUMMARY OF THE INVENTION

Therefore, one objective of the present invention is to provide an image object segmentation method for detecting changes and updating processes to solve the above-mentioned problems.

An embodiment of the present invention discloses a method for video object segmenting, comprising: (a) detecting a changing state between a current frame and a previous frame; (b) categorizing the current frame as a moving region, a still region, or a background region and an uncovered background region according to the detecting result from the step (a); (c) determining a moving object in the current frame according to the sorting result from the step (b); and (d) updating a background component.

Step (d) can also further comprise: (d1') removing non-static components from the still region; and (d2) updating the still region to part of the background component if the still region determined in step (c) keeps static for more than a predetermined amount of time. The step (d1') utilizes a region adjacent graphic to determine if there is any moving region adjacent to the still region to remove the non-static component.

The step (a) can also further comprise: (a1) detecting the pixel difference between the current frame and the previous frame; and (a2) detecting the pixel value difference between the current frame and the background component; wherein step (b) processes according to step (a1) and (a2). Step (a1) can comprises: analyzing the gray level distribution of the pixel value difference to determine a specific gray level difference value with the most pixel numbers; determining a background standard deviation corresponding to a specific background model, according to the specific gray level difference value and a pixel number corresponding to the specific gray level difference value; and classifying the pixels in the current frame according to the background standard deviation.

The method of the present invention can further comprise: (e) using hierarchy block segmentation method to find a plurality of edge blocks corresponding to the moving object, to amend the outline of the moving object. Step (e) can also comprise: (e1) segmenting the moving object to a plurality of blocks by using the size of a block; (e2) determining if each one of the blocks is a moving block or not, and if yes, then keeping the block as an edge block. If no, then removing the block; and (e3) reducing the size of the block; wherein the steps (e1), (e2) and (e3) are repeated until the block size reaches a predetermined block size.

Alternatively, the method can further comprise: (e') estimating background component of the outline of the moving object. The step (e') comprises: obtaining a plurality edge region growing seeds; performing region growing according to the region growing seeds to generate an edge region corresponding the background component; and removing the outline of the moving object to estimate the edge region.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a flow chart illustrating a video object segmentation method according to a preferred embodiment of the present invention.

FIG. 3(b) is a schematic diagram illustrating a table corresponding to step 103 as shown in FIG. 1.

FIG. 7 is a schematic diagram illustrating step 506 of FIG. 5.

DETAILED DESCRIPTION

Some concepts of the present invention have already been published in the proceedings of conference, as described below: Thou-Ho (Chao-Ho) Chen, Tsong-Yi Chen and Yung-Chuen Chiou, "An Efficient Real-Time Video Object Segmentation Algorithm Based On Change Detection And Background Updating", *IEEE* 2006 *International Conference on Image Processing (ICIP)*, Atlanta, Ga., USA, Oct. 8-11, 2006. (pp. 1837-1840)

FIG. 1 is a flow chart illustrating the video object segmentation method according to a preferred embodiment of the present invention. As shown in FIG. 1, the video object segmentation method comprises:

Step 101: Detect a change of state between a current frame and a previous frame.

Step 103:

Categorize the current frame as a moving region, a still region, a background region, or an uncovered background region according to the detecting result from the step 101.

Step 105:

Determine a moving object in the current frame according to the sorting result from the step 103.

Step 107:

Update a background component in the frame.

Detailed steps of the above will be further discussed below.

Figure 2A:
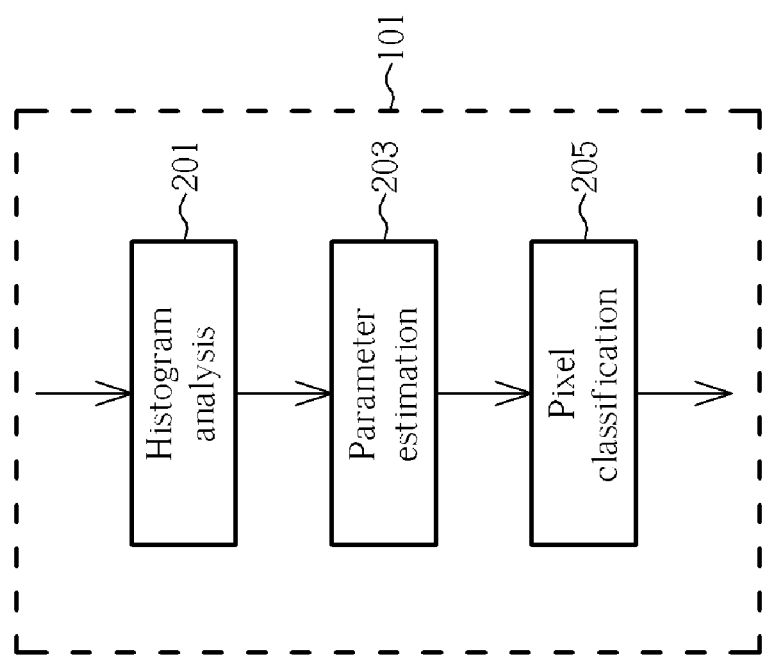
FIG. 2(a) is a flow chart illustrating details of step 101 as illustrated in FIG. 1.
Figure 2B:
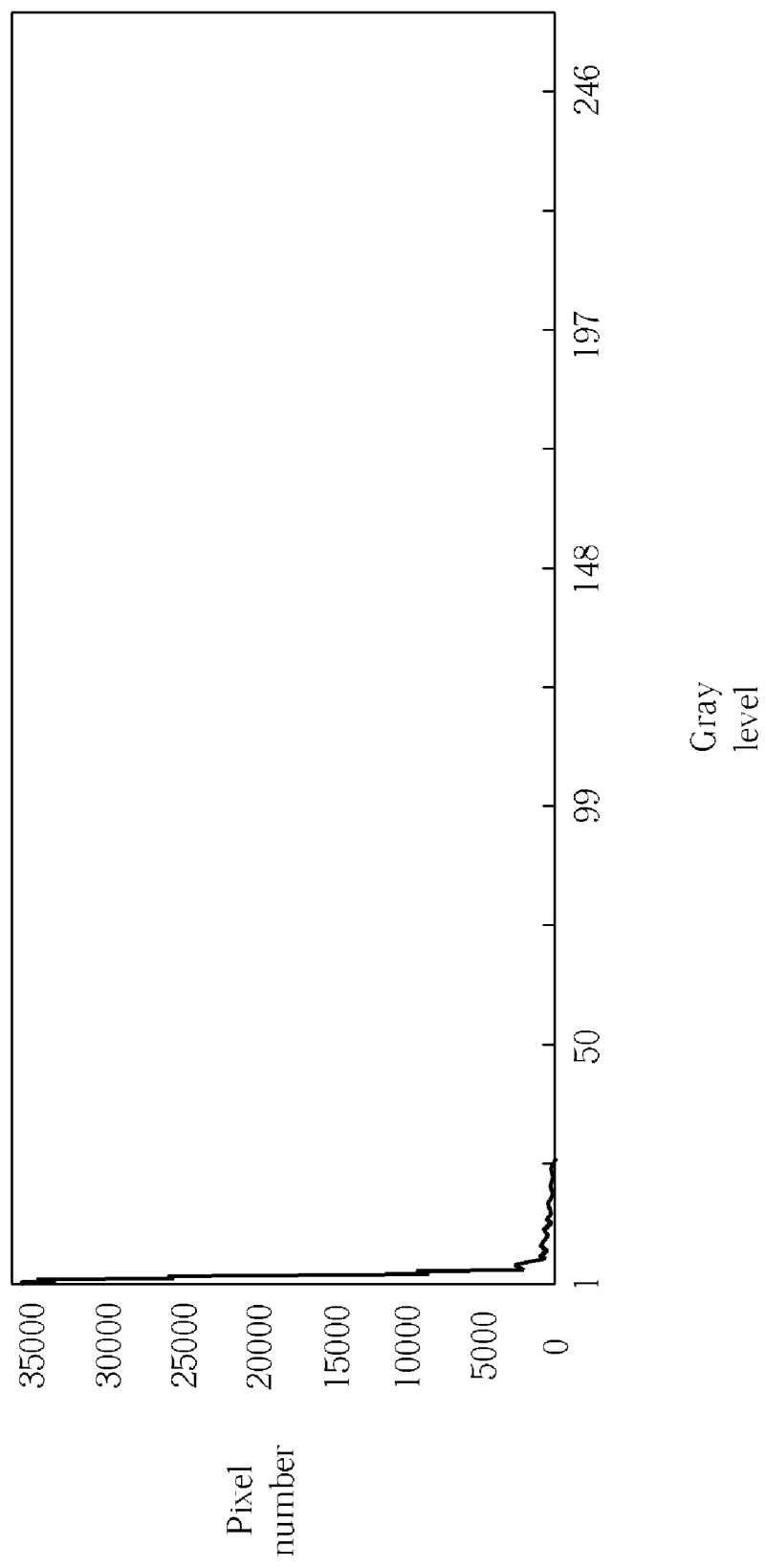
FIG. 2(b) is a schematic diagram illustrating step 201 of FIG. 2(a).

FIG. 2(*a*) is a flow chart illustrating further detail of step 101 as illustrated in FIG. 1. As shown in FIG. 2, step 101 further comprises:

Step 201:

Histogram analysis.

Step 203

Parameter estimation.

Step 205

Pixel classification.

Step 201 utilizes histograms to provide the distribution of the image gray levels or color (not illustrated). As shown in FIG. 2(*b*), the horizontal axis is gray level value, and the vertical axis indicates the number of pixels corresponding to different gray values. By this method, the gray level having the most pixels can be found.

Normally, differences between images comprise static backgrounds and moving objects, with moving objects always generating larger intensity changes. Otherwise, subjects with weaker intensities always correspond to background regions as the static part. As shown in FIG. 2(*b*), most part of the gray level distribution centers on gray level 0, therefore these gray levels are the most suitable ones for indicating the background region in the difference value of frames. Thus a gray level with the greatest pixel numbers in a gray level range r is selected as a reference for the following parameter estimation. The histogram of difference value image DI can be shown as Equation 1, where p indicates the gray level value of pixels:

His(p)=Number{(i,j)|DI(i,j)=p,(i,j)∈ DI}    Equation 1

If the gray level with the maximum number of pixels p' in the range of r, then the number of which is His(p'). If the gray level number is the same, then the larger gray level is selected. In this embodiment, the preferred value of parameter r is 100.

The main purpose of step 203 is to estimate a background model from the difference value of the image. In this case, if the difference value of the static background region is caused by camera noise, then the distribution can be regarded as Gaussian distribution. If the pixel of the background in the difference value image is a random variable d, the probability density function of Gaussian distribution can be shown as Equation 2:

$$p(d) = \frac{1}{\sqrt{2\pi\sigma_b^2}} e^{\left(-\frac{(d-u_b)^2}{2\sigma_b^2}\right)}$$    Equation (2)

wherein $\mu_b$ and $\mu\sigma_b^2$ respectively represent the mean and variance of the background region.

Next, when estimating mean and variance of the background region. First, the location of pixels having gray level p' in the difference value image is found. An estimation window w with size N is used for consideration. After that, the mean u and standard deviation std, as shown in Equation (3) is computed.

$$\mu_{w_i}(p') = \frac{1}{N}\sum_{j=1}^{N} w_i(j)$$

$$std_{w_i}(p') = \sqrt{\frac{1}{N}\sum_{j=1}^{N} [w_i(j) - \mu_{w_i}(p')]^2}$$

for $i = 1, 2 \ldots His(p')$

Equation (3)

Since p' and nearby pixels are considered, the accuracy of the estimation references is higher. Also. In an embodiment of the present invention, the size of estimation window is 3×3. After, the estimated mean and variance are equalized to indicate the parameter of background, as shown in Equation 4:

$$\mu_b = \frac{1}{his(p')}\sum_{i=1}^{his(p')} \mu_{w_i}(p')$$

$$\sigma_b = \frac{1}{his(p')}\sum_{i=1}^{his(p')} std_{w_i}(p')$$

for $i = 1, 2 \ldots His(p')$

Equation (4)

Step 205 utilizes the background variance $\sigma_b$ obtained by above-mentioned parameter estimation, and multiplies a constant c to indicate the threshold value Th ($=c\sigma_b$). Next, if the difference value between the pixel value and the background mean value $\mu_b$ of the difference value image is larger than this threshold value, than the pixel is classified as a foreground part (that is, gray level value 255), otherwise it is background part (that is, the grey level 0), which can be shown as Equation (5):

If (|DI(I,j)−$\mu_b$|>Th) foreground pixel else background pixel    Equation (5)

Wherein the constant c is used for controlling the intensity of pixel classification, and noise may be incorrectly determined to the foreground while c is small. Otherwise, the increasing of c may regard the object component with smaller object moving amount as background. Therefore the constant c is mainly determined by the level of change of the frame concept. C needs a higher value if the concept has a larger change. Otherwise, c has a smaller value if c has smaller change. In this embodiment, the better value of constant c is located between 0 to 10. The main purpose of step 105 is to combine the frame difference mask, which can change the detection result, and the background subtraction mask is for detecting the situation of object region.

Figure 3A:
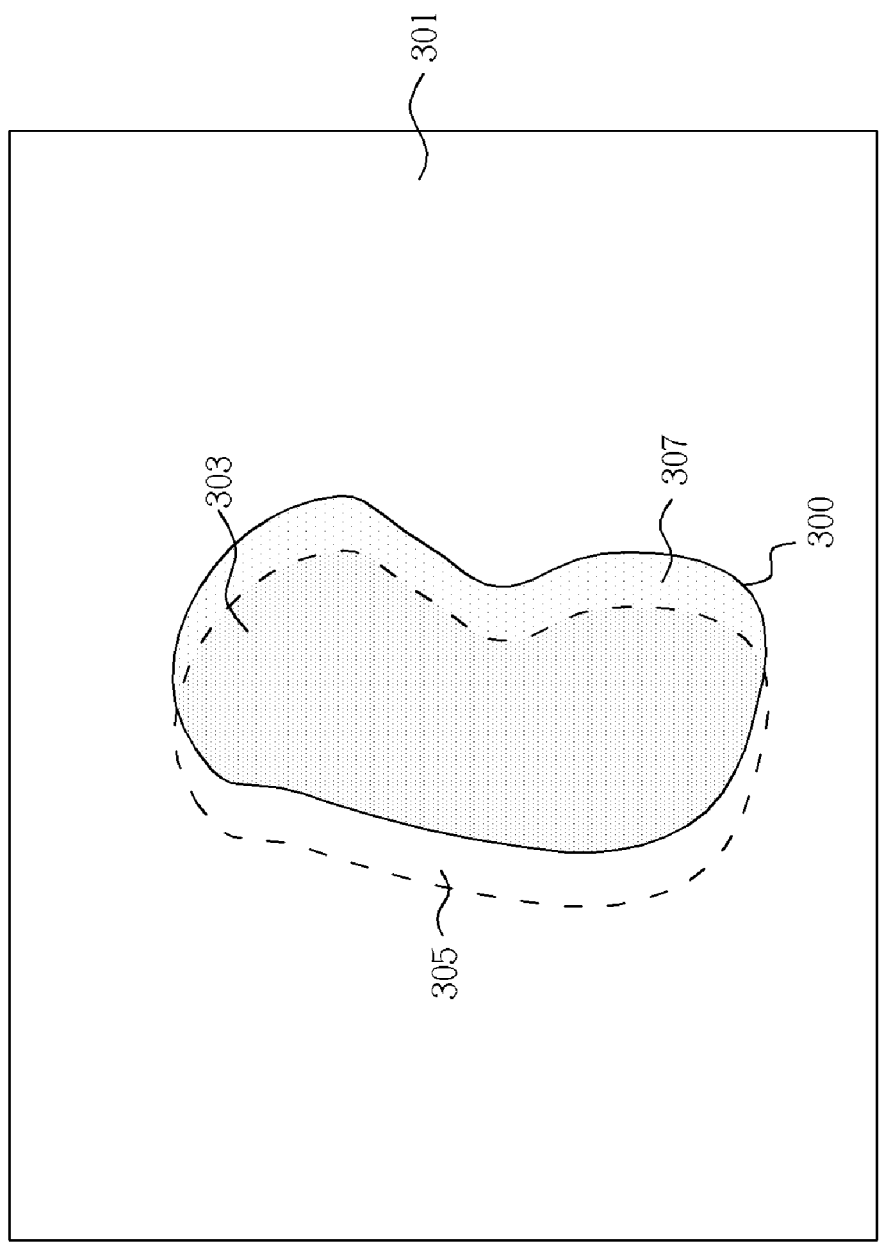
FIG. 3(a) is a schematic diagram illustrating details of step 103 illustrated in FIG. 1.

FIG. 3(a) is a schematic diagram illustrating detail of the step 103 illustrated in FIG. 1. As shown in FIG. 3(a), four regions are generated while the object 300 moves from left to the right. Four regions comprise: background region 301, still region 303, uncovered background region 305 and moving region 307.

The issue that the video segmentation method based on change detection always has is that the still region 303 is incorrectly determined to the background region 301, and the uncovered background region 305 is wrongly determined to part of the moving object 307. Though some prior art is disclosed to solve such problems, the computing amount is cumbersome since motion estimation is used to detect the uncovered background region.

Therefore, the present invention utilizes a frame difference mask and background subtraction mask to detect every region, as shown in FIG. 3(b). In FIG. 3(b), the ON state indicates the pixel is determined to "changed", and OFF indicates "unchanged". After that, the detected background region 301 and uncovered region 305 can be deleted from the mask, thus the uncovered background region only outputs moving region 307 and still region 303 for following processes.

The main purpose of step 107 is to establish reliable background information from inputted frames, such that the above-mentioned uncovered background region step can be correctly performed, and allow the segmentation region of the object to be more complete. For example, if background updating is not used, then the original moving object region will be wrongly determined for segmentation if the original moving object in the frame moves in few frames. Alternatively, an object can be regarded as part of the background region by viewers if an original moving object becomes a still object for a period of time. Thus the method for updating background is necessary, or else the still object will be regarded as a moving object and become segmented.

Many prior art background updating algorithms manage to establish a background frame, which utilizes the difference value between the frames to be as the input of a Kalman filter to estimate background updating information. Such methods should update the Kalmen gaining matrix. However, this requires a huge computer processing amount. Also, such a method cannot process the first frame if the moving object appears in video movies, thus it is hard to employ in practical application.

In the background updating method of the present invention, reliable background information is necessary to allow for segmentation of moving objects to fit an actual situation. The utilized operator should be simplified to increase processing speed. The idea of which, is since the object keeping still for a period of time does not change, it should be updated into the background. Thus an accumulator is used to record the still level of moving. The still level of the moving object is regarded as high if the accumulated amount of the accumulator is high, otherwise it is low. Then, if the accumulated value is higher than the predetermined threshold value, then the corresponding pixels of the present frame are updated to background image.

Figure 4:
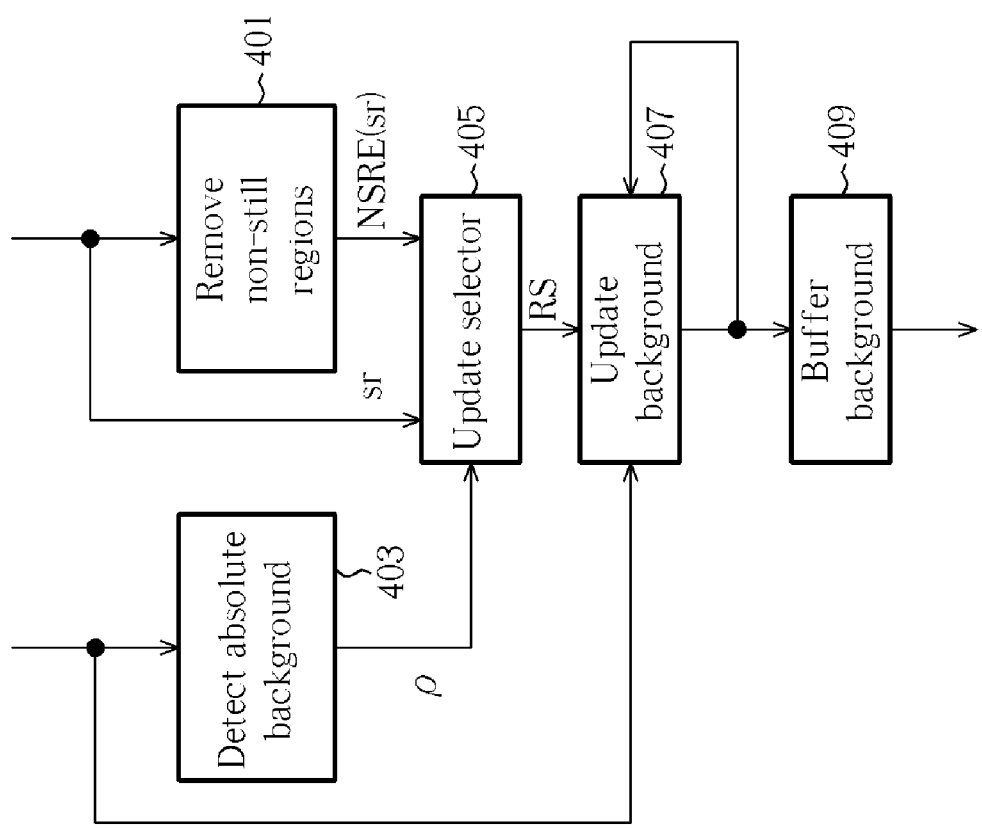
FIG. 4 is a flow chart illustrating details of step 107 illustrated in FIG. 1.

FIG. 4 is a flow chart illustrating the detail of step 107 illustrated in FIG. 1, which comprises:
Step 401:
Remove non-still regions.
Step 403:
Detect an absolute background.
Step 405:
Update selector.
Step 407:
Update the background.
Step 409:
Buffer the background.

The above-mentioned steps are further described as below. The background updating mechanism of the present invention uses the static region mask of the object region detecting result as an input. Normally, still regions not only comprise real still regions, but also other regions, including the small region noise from outside interference, or the frame difference value inside the moving object. Such regions are regarded as still regions while object region detecting is performed, but the regions are part of the moving regions, in fact.

Therefore, step 401 should be performed to remove actual still regions from still regions, such that only the actual (real) still regions can enter the background upgrading process. Normally, the still region will connect the moving region generating region if the still region belongs to part of the moving region, but the real still region doesn't. Therefore, region adjacent graphics can be used to determine if there is any moving region nearby the still region. If yes, then the still region is removed and real still regions are left.

Step 401 will fail if the first frame has a moving object. Since the region generated from the moving object leaves the original location, the connected region will be regarded as a moving object and removed. Therefore, no real still region is transmitted to the background updating module. Step 403 is therefore used first to determine if the first frame of inputted video comprises moving objects or not. If not, then step 401 is performed rather than step 405. step 405 is performed without going through step 401. Step 403 utilizes higher-order-statistics to determine if the changing region of the first frame and the n-th frame is larger than the predetermined threshold value. If so, then it means a moving object appears in the first frame, otherwise, it means no moving object appears in the first frame.

Equation (6) refers to a mean absolute background determination computing of four-order moments, and Equation (7) refers to an updating selector of region selection.

$$\mu_{1,n} = \frac{1}{W \times H} \sum_{i \in H} \sum_{j \in W} |f_n(i,j) - f_1(i,j)| \quad \text{Equation (6)}$$

$$\rho = \sum_{i \in H} \sum_{j \in W} (d'(i,j) - u_{1,n})^4$$

$$RS = sr, \text{ if } \rho > Sth \; NSRE(sr), \quad \text{Equation (7)}$$
otherwise In which the W and H indicates the size of frame and d'(i, j) indicates the difference value between the first frame and the n-th frame. In the present invention, Sth is set to 150, and n is determined by the change of frame.

According to the preferred embodiment of the present invention, the change of RSt in a period of time should be considered for updating of the background frame. Since the still object keeps still for a period of time, and belongs to part of the background. An accumulator is used for accumulating the pixel changing times for a period of time, and the pixels are updated to the background frame while the accumulated value reaches a predetermined threshold value. The process of background updating is shown as equation (8).

$$SM_t(i, j) = \begin{cases} SM_{t-1}(i, j) + 1, & \text{if } RS_t(i, j) \text{ is active pixel} \\ 0, & \text{otherwise} \end{cases} \quad (8)$$

if $(t = 1)$ $BI_t(i, j) = f_t(i, j)$ else $$BI_t(i, j) = \begin{cases} f_t(i, j), & \text{if } SM_t(i, j) = F_{th} \\ BI_{t-1}(i, j), & \text{otherwise} \end{cases}$$

In equation (8), $RS_t(i, j)$ indicates the outputting result for updating the selector at time t, and the pixels of which comprise two states of changing and unchanging. $SM_t(i, j)$ is an accumulator for recording the pixel changing times in the current frame $RS_t(i, j)$, and $F_{th}$ is a predetermined threshold value. Therefore, the first frame is used originally as an initial background, and the initial value of the accumulator is set to 0. Then, the pixels of the current frame are updated to current background $BI_t(i, j)$ if the accumulated times reach Fth, otherwise the pixels of the previous background $BI_{t-1}(i, j)$ are updated to the current background.

Figure 5:
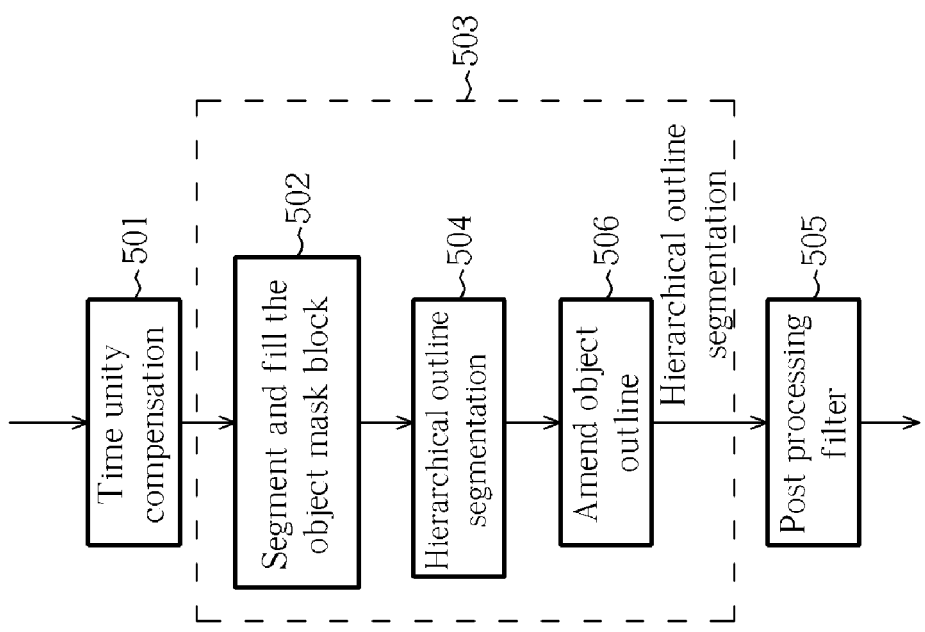
FIG. 5 is a flow chart illustrating detailed steps of the object outline improving method according to an embodiment of the present invention.

Besides the above-mentioned steps, the present invention further provides an object outline improvement method for eliminating noise regions, such that the lacking or protruding parts of the object outline. This can be repaired, and accurate outline information can be obtained as a result. FIG. 5 is a flow chart illustrating the detailed steps of the object outline improvement method according to an embodiment of the present invention. The inputted data is the output from the above-mentioned video object segmentation method, that is, the union of the object region detecting results. As shown in FIG. 5, the method comprises:

Step 501:
Time unity compensation.
Step 503:
Hierarchical outline segmentation.
Step 505:
Post processing filter.

Since the moving object may move slowly or part of which is silent in a particular time period, the object mask may be incomplete after changing detection, such that the segmented object region has a defect issue. Since each frame has a high relation in the signal process, step 501 utilizes this idea to compensate for incomplete regions. Such a method is well-known by persons skilled in the art, and is omitted for brevity. In the preferred embodiment of the present invention, step 501 is not necessary to perform step 503, because Time unity compensation will decrease the quality of video object segmentation.

The step 503 segments the original object mask to blocks and uses each block as processing unit and determine if the edge block belongs to a moving block or not. If it does then it is retained, otherwise the block is removed. Afterwards, the block sizes are gradually reduced, and the above-mentioned operations are repeated until the object outline is stable. Finally, object edge improvement methods are utilized to obtain complete object outlines. Step 503 can comprise:

Step 502:
Segment and fill the object mask block.
Step 504:
Hierarchical outline segmentation.
Step 506 Amend object outline.

Detailed operations of each step will be further described as below.

Step 503 originally utilizes a 16×16 block. Therefore, step 502 is performed to block-segment the original object mask. Also, since the edge block is utilized for subject operation, the un-filled edge block should be filled again.

Figure 6:
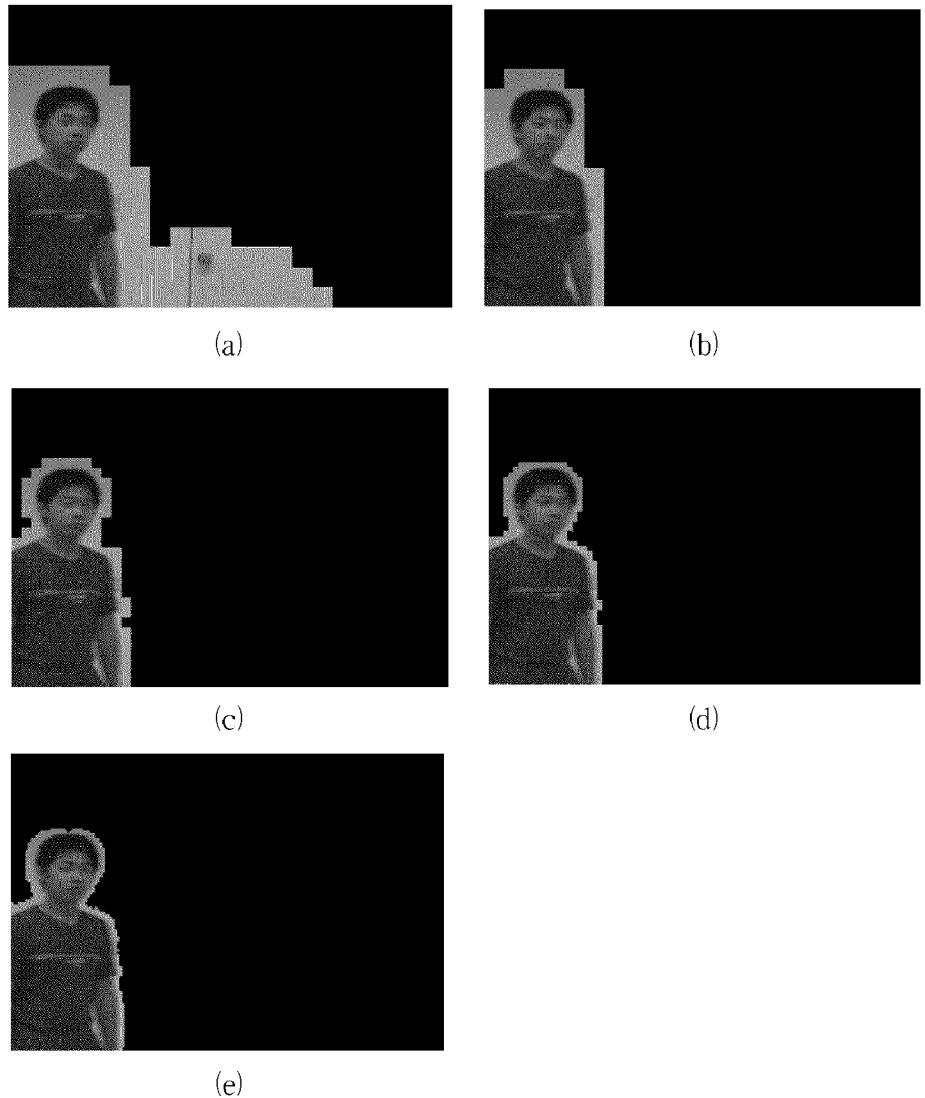
FIG. 6 is a flow chart illustrating the detailed steps of the hierarchy block segmentation method according to the present invention.

After block segmentation and filling, the object edge block should be processed. The function is shown as equation (9) to determine if it is a moving block or not. If yes, retain the block, otherwise remove it. Afterwards, the next layer edge block is checked until no moving block is found. Then, the above-mentioned steps are repeated until the block size reaches 2×2. FIG. 6 is a flow chart illustrating the detailed steps of the hierarchy block segmentation method according to the present invention. FIG. 6(a) indicates the original object mask block, FIG. 6(b) indicates 16×16 hierarchical segmentation, FIG. 6(c) indicates 8×8 hierarchical segmentation, FIG. 6(d) indicates 4×4 hierarchical segmentation, and FIG. 6(e) indicates 2×2 hierarchical segmentation.

If $(VBi < V_{Diff(G(ft), G(ft-1))} + \lambda)$ the block is removed else the block is kept  Equation (9)

wherein the $V_{Diff(G(ft), G(ft-1))}$ indicates the difference in variance of the adjacent frames and the gradient images, $V_{Bi}$ indicates the variance of the i-th object edge block, and $\lambda$ indicates a constant as shown in equation (10).

if (blocksize=16)

$\lambda = 2$ else if (blocksize=16)

$\lambda = 1.5$ else if (blocksize=4)

$\lambda = 1$ else if (blocksize=2)

$\lambda = 0.5$  Equation (10)

Though better object outlines can be obtained after step 504, the effect of hierarchical outline segmentation may still be remain however The inner of object can thus be corrupted and background region may still exist surrounding the object edge. Thus, step 506 is needed to improve these defects.

According to a preferred embodiment of the present invention, original object mask and hierarchical outline segmentation gradient changing are used to eliminate the effect of hierarchical outline segmentation. If $OM_i$ and $OM_h$ are assumed to respectively indicate the original object mask and the mask after hierarchical outline segmentation, and $G_i$ and $G_h$ are assumed to indicate the mask corresponding to original frames, then the gradient frame after type gradient operation can be shown as FIG. 7(a) and FIG. 7(b). FIG. 7(a) indicates the gradient frame of the original object mask, and FIG. 7(b) indicates the gradient frame of the hierarchical segmentation mask.

After that, the following steps are performed:

Step1: Eliminate the gradient pixel of the most outside layer of $G_i$ and $G_h$, such that the pixel gradient of the most outside layer will not be considered in the following steps.

Step2: Find different regions from $OM_i$ and $OM_h$ and utilize $R_{i,h}$ to indicate the union of the pixels in this region, as shown in equation (11).

$R_{i,h} = \{Om_r | Om_r \cap Om_j = 0 \forall Om_r \in OM_i, Om_j \in OM_h\}$  Equation 11

Step3: Find pixels with pixel gradients larger than threshold value $\phi$ from $R_{i,h}$, such as equation (12), wherein p indicates the union of the pixels larger than the threshold value. Finally, compensate the pixels to the frames affected by the hierarchical outline segmentation effect.

$P = \{G_i(p') > \phi | p' \in R_{i,h}\}$  Equation 12

Background always exists at the outline surrounding of the segmented objects, however, the compression ratio based on object compression may be decreased. Therefore, the present invention further utilizes region growing methods to eliminate the background part of the object outline surrounding, to make the object outline more accurate. Finally, the post processing filter can be used for performing the final process of the outline improvement technique to eliminate noise regions and perform type smoothing procession. Since the edge region growing and post processing filter are well-known by persons skilled in the art, it is omitted for brevity.

Figure 8:
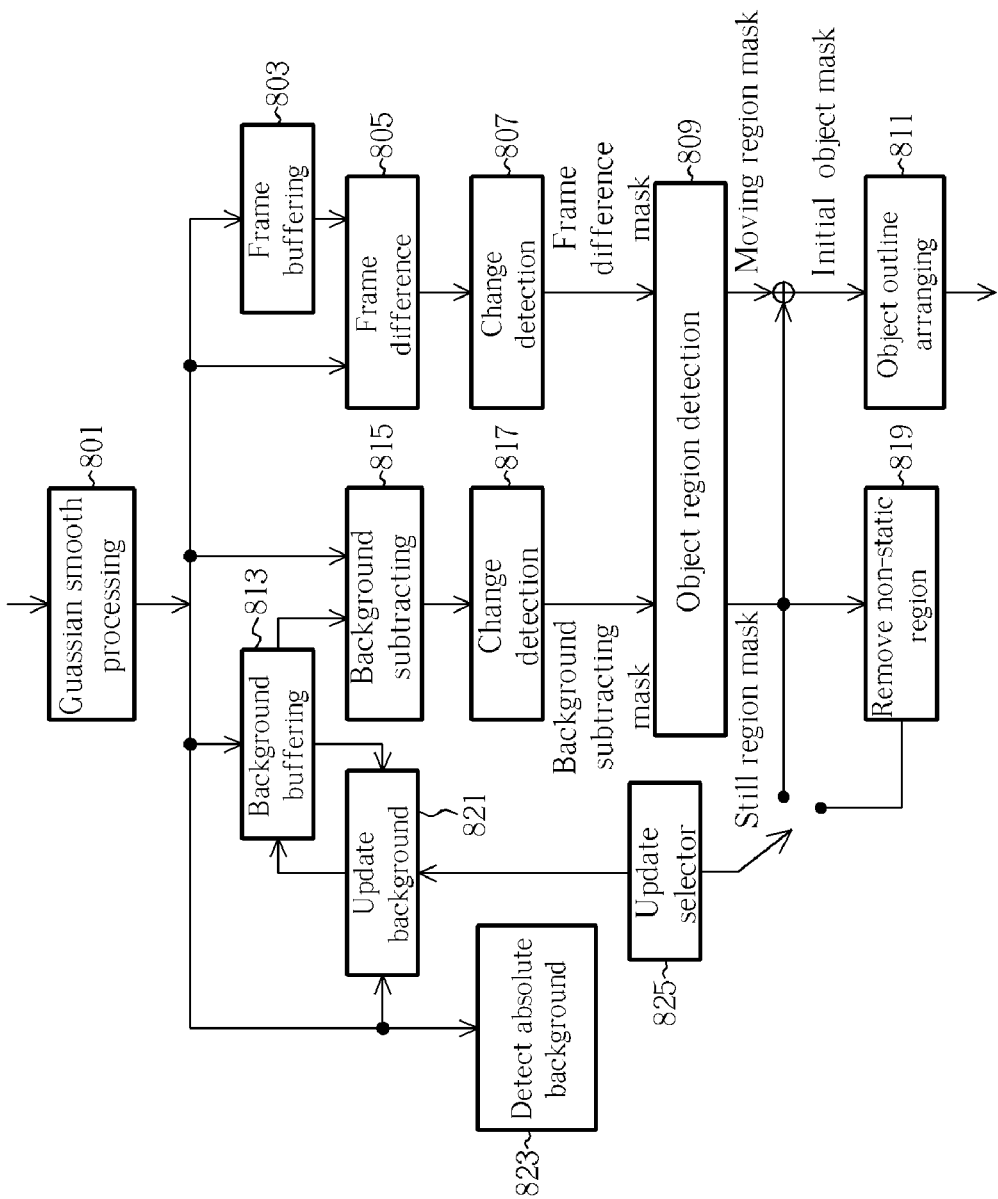
FIG. 8 is a flow chart illustrating the video object segmentation method according to a preferred embodiment of the present invention.

FIG. 8 is a flow chart illustrating video object segmentation method according to a preferred embodiment of the present invention, which comprises:

Step 801:
Guassian smooth processing.
Step 803:
Frame buffering.
Step 805:
Frame difference.
Step 807:
Change detection.
Step 809:
Object region detection.
Step 811:
Object outline arrangement.
Step 813:
Background buffering.
Step 815:
Background subtracting.
Step 817:
Change detection.
Step 819:
Remove non-static region:
Step 821:
Update background.
Step 823:
Detect absolute background.
Step 825:
Update selector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for video object segmenting, comprising:
   (a) detecting a changing state between a current frame and a previous frame;
   (b) categorizing regions of the current frame as a moving region, a still region, or a background region and an uncovered background region according to the detecting result from the step (a), to generate a sorting result;
   (c) determining a moving object in the current frame according to the sorting result from the step (b), to determine a still region and a non still region; and
   (d) updating a background component, and updating the still region to part of the background component if the still region determined in step (c) keeps static for more than a predetermined time.

2. The method of claim 1, further comprising:
   removing noise in the current frame by utilizing a smoothing filter before the step (a).

3. The method of claim 1, wherein the step (d) is performed only if a first frame has a moving object.

4. The method of claim 1, wherein the step (d) further comprises:
   (d1) removing non-static components from the still region.

5. The method of claim 4, wherein the step (d1) is performed only if a first frame has no moving object.

6. The method of claim 4, wherein the step (d1) utilizes a region adjacent graphic to determine if there is any moving region adjacent to the still region to remove the non-static component.

7. The method of claim 1, wherein the step (a) further comprises:
   (a1) detecting the pixel difference between the current frame and the previous frame; and
   (a2) detecting the pixel value difference between the current frame and the background component;
   wherein the step (b) is performed according to results of the step (a1) and (a2).

8. The method of claim 1, wherein the step (a) comprises:
   analyzing the gray level distribution of the pixel value difference to determine a specific gray level difference value with the most pixel numbers;
   determining a background standard deviation corresponding to a specific background model, according to the specific gray level difference value and a pixel number corresponding to the specific gray level difference value; and
   classifying the pixels in the current frame according to the background standard deviation.

9. The method of claim 1, further comprising:
   (e) using a hierarchy block segmentation method to find a plurality of edge blocks corresponding to the moving object to amend the outline of the moving object.

10. The method of claim 9, wherein the step (e) comprises:
    (e1) segmenting the moving objects to a plurality of blocks by using the size of a block;
    (e2) determining if each one of the blocks is a moving block or not, if yes, then keep the block as an edge block, if no, remove the block; and
    (e3) reducing the size of the block;
    wherein the steps (e1), (e2) and (e3) are repeated until the block size reaches a predetermined block size.

11. The method of claim 9, wherein the step (e) further comprises:
    compensating the outline of the moving object corresponding to the edge blocks according to the pixel gradient.

12. The method of claim 1, further comprises:
    (e) estimating the background component of the outline of the moving object.

13. The method of claim 12, wherein the step (e) comprises:
    obtaining a plurality of edge region growing seeds;
    performing region growing according to the region growing seeds to generate an edge region corresponding to the background component; and
    removing the outline of the moving object to estimate the edge region.

14. The method of claim 1, further comprising estimating the noise of the outline of the moving object.

15. The method of claim 1, further comprising smoothing the outline of the moving object.

* * * * *